(12) United States Patent
Kawasaki

(10) Patent No.: US 8,249,599 B2
(45) Date of Patent: Aug. 21, 2012

(54) TERMINAL, RANDOM ACCESS SIGNAL TRANSMISSION METHOD, AND BASE STATION

(75) Inventor: Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 300 days.

(21) Appl. No.: 12/423,954

(22) Filed: Apr. 15, 2009

(65) Prior Publication Data
US 2009/0197605 A1   Aug. 6, 2009

Related U.S. Application Data

(63) Continuation of application No. PCT/JP2007/051918, filed on Feb. 5, 2007.

(51) Int. Cl.
*H04W 36/00* (2009.01)
*H04W 4/00* (2009.01)

(52) U.S. Cl. ........................... 455/437; 370/331

(58) Field of Classification Search .................. 455/437, 455/69, 436, 522, 450, 452, 67.1, 509, 127.1, 455/127.5, 442, 67.4, 525, 439; 370/338, 370/328, 331
See application file for complete search history.

(56) References Cited

U.S. PATENT DOCUMENTS

| | | | |
|---|---|---|---|
| 2001/0046864 A1 | 11/2001 | Bhatoolaul et al. | |
| 2004/0136336 A1* | 7/2004 | Nakamura et al. | 370/328 |
| 2006/0281417 A1* | 12/2006 | Umesh et al. | 455/69 |
| 2007/0032257 A1* | 2/2007 | Kim et al. | 455/522 |
| 2009/0129335 A1* | 5/2009 | Lee et al. | 370/331 |

FOREIGN PATENT DOCUMENTS

| | | |
|---|---|---|
| EP | 1 134 992 | 9/2001 |
| JP | 2001-313968 | 9/2001 |

OTHER PUBLICATIONS

3GPP TR 25.814 V7.1.0 (Sep. 2006) Technical Report; 3rd Generation Partnership Project; Technical Specification Group Radio Access Network; Physical layer aspects for evolved Universal Terrestrial Radio Access (UTRA) (Release 7); Sophia Antipolis, Valbonne, France; Dated Sep. 2006.

* cited by examiner

Primary Examiner — Melody Mehrpour
(74) Attorney, Agent, or Firm — Myers Wolin, LLC

(57) ABSTRACT

A hand-over request reception unit receives a hand-over request from a hand-over source base station. When the hand-over request is received, a terminal count acquisition unit obtains the number of terminals each sending a random access signal. A transmission power offset value calculation unit calculates a transmission power offset value of a random access signal to be sent from a terminal performing a hand-over to the base station, in accordance with the number of terminals obtained by the terminal count acquisition unit. A transmission power offset value transmission unit sends the transmission power offset value through the hand-over source base station to the terminal.

8 Claims, 9 Drawing Sheets

TERMINAL, RANDOM ACCESS SIGNAL TRANSMISSION METHOD, AND BASE STATION

This application is a continuation application, filed under 35 U.S.C. §111(a), of International Application PCT/JP2007/051918, filed Feb. 5, 2007, now pending, the contents of which are herein wholly incorporated by reference.

FIELD

The embodiment discussed herein is related to terminals, random access signal transmission methods, and base stations.

BACKGROUND

The standard of so-called Long Term Evolution (LTE) system, as a next-generation cellular system after the Universal Mobile Telecommunication System (UMTS) based on W-CDMA, is being developed under the Third Generation Partnership (3GPP). In the uplink of LTE system, data transmission based on random access is performed in addition to data transmission based on a schedule, as in the current Wideband Code Division Multiple Access (W-CDMA) (refer to 3GPP TR25.814, for example).

Random access is used, for example, in initial access when the terminal accesses the base station for the first time, such as at power-on, in initial access to a hand-over destination base station when the terminal performs a hand-over to the adjacent cell, in a transition from an idle state to an active state, when synchronization is restored in the active state, and the like.

In random access, all terminals each are basically permitted to send a random access signal simultaneously. Accordingly, the random access signals sent from the terminals simultaneously can cause collision at the base station. A terminal which sent a random access signal that has been received by the base station and has survived the collision can continue subsequent processing. A terminal which sent a random access signal that has not been received successfully by the base station because of a signal collision error sends a random access signal again.

It is assumed that a plurality of terminals each will send a random access signal simultaneously and that signal collision will occur. A terminal which sent a random access signal that has not been received successfully by the base station because of collision needs to perform retransmission. This means that transmission processing time of the random access signal is prolonged and affects the time the terminal needs to access the base station.

Random access in a hand-over to an adjacent cell needs to be performed in a shorter period than random access in initial access such as at power-on. Especially, in a hand-over during a voice call, it is important that access to the hand-over destination base station be completed in a short period, so that voice will not be interrupted nor interrupted in an unacceptably long time.

The possibility that the random access signal sent from the terminal in a hand-over is not received successfully by the base station because of collision needs to be reduced.

SUMMARY

According to an aspect of the invention, in a terminal which sends a random access signal to a base station at a first occasion and a second occasion, the terminal includes: a control unit which performs a control operation to increase transmission power of sending the random access signal when the signal is sent at the first occasion, in comparison with when the signal is sent at the second occasion; and a transmission unit which sends the random access signal with the transmission power controlled by the control unit; wherein the first occasion is a hand-over, and the second occasion is power-on of the terminal, transition from an idle state to an active state, or loss of synchronization in the active state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

An embodiment of the present invention will be described below with reference to the accompanying drawings.

Figure 1:
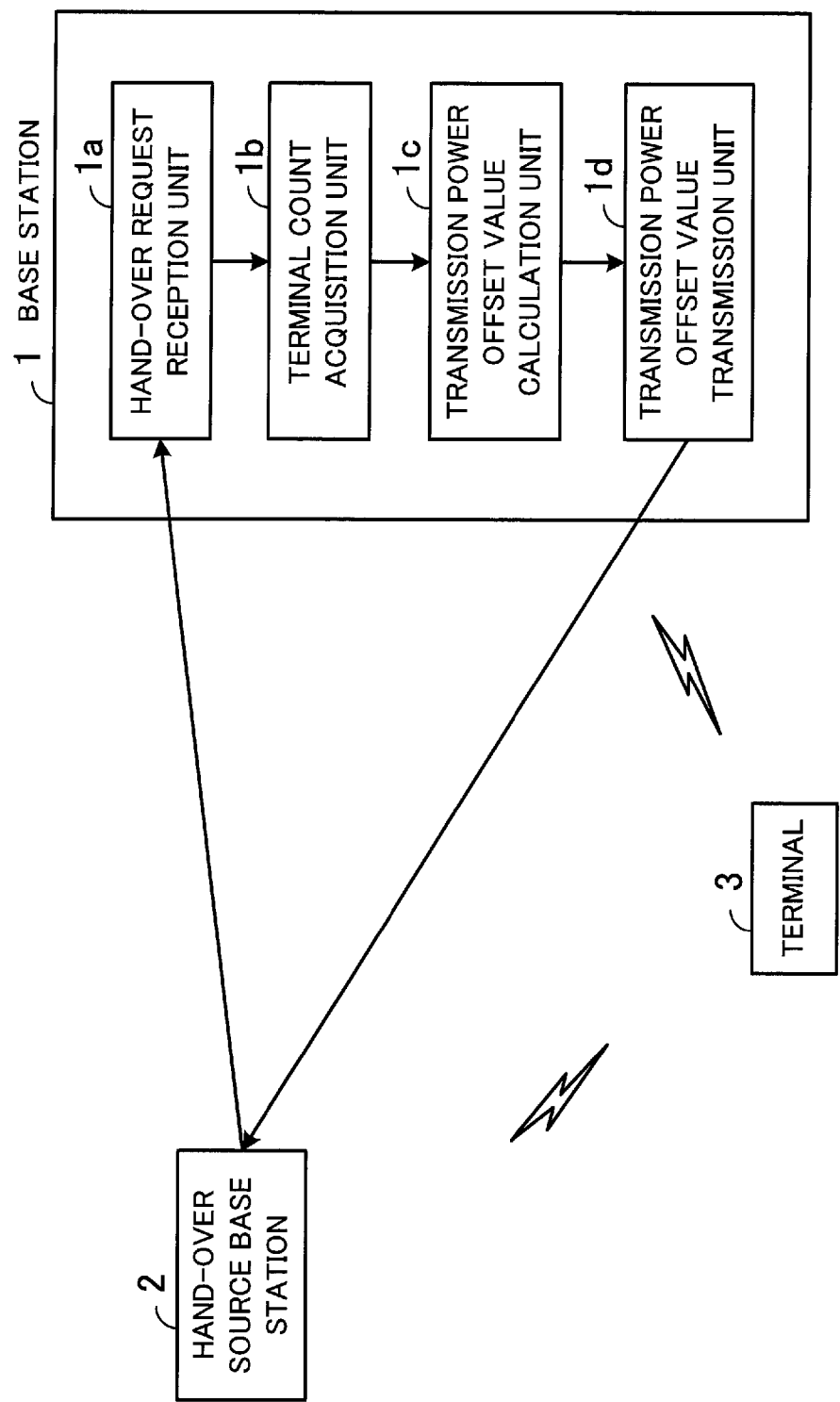
FIG. 1 is a diagram illustrating an outline of a base station.

FIG. 1 is a diagram illustrating an outline of a base station. As presented in FIG. 1, the base station 1 includes hand-over request reception unit 1a, terminal count acquisition unit 1b, transmission power offset value calculation unit 1c, and transmission power offset value transmission unit 1d. FIG. 1 presents a hand-over source base station 2 and a terminal 3 in addition to the base station 1.

The terminal 3 measures the reception power of reference signals or the like (common pilot signals or the like) sent from base stations in a plurality of nearby cells and sends the measurement results to the hand-over source base station 2. If it is determined that the terminal 3 needs a hand-over because of increased reception power of the base station 1, the hand-over source base station 2 sends a hand-over request to the base station 1.

The hand-over request reception unit 1a of the base station 1 receives the hand-over request from the hand-over source base station 2.

The terminal count acquisition unit 1b obtains a predicted number of terminals that may send a random access signal, at the reception of the hand-over request (triggered by the reception of the hand-over request).

A numeric value representing the possibility of contention (collision) between a random access signal sent from the terminal 3 to the hand-over destination and other random access signals is obtained.

The random access signal is sent, for example, in initial access when the terminal accesses the base station for the first time (second occasion), such as at power-on, in initial access to a hand-over destination base station when the terminal performs a hand-over to the adjacent cell (first occasion), in transition from an idle state to an active state (second occasion), when synchronization is restored in the active state (second occasion), and the like. Accordingly, as the number of terminals (such as terminals in the active state) in an adjacent cell increases, the possibility is updated to a higher value. As the number of random access signals received in a past occasion of random access signal transmission (or the average value of the numbers of random access signals received in a given number of past occasions of transmission, such as the last occasion and the occasion before the last) increases, the possibility is updated to a higher value. As these numbers decrease, the possibility is updated to a lower value.

The transmission power offset value calculation unit $1c$ calculates a transmission power offset value for a random access signal to be sent by the terminal 3 performing a hand-over to the base station 1, in accordance with the predicted number of terminals obtained by the terminal count acquisition unit $1b$. For example, a greater offset value is obtained as the predicted number of terminals increases, and a smaller offset value is obtained as the predicted number of terminals decreases. In a simple example, if the predicted number of terminals falls below a given threshold value, a first offset value X1 is obtained; and if the predicted number of terminals is greater than the given threshold value, a second offset value X2 is obtained (X1<X2).

In short, the offset value is calculated in accordance with the degree of possibility of contention between the random access signal sent to the hand-over destination from the terminal 3 performing the hand-over and other random access signals. When the possibility of contention is high, a high offset value is obtained; and when the possibility of contention is low, a low offset value is obtained.

The transmission power offset value transmission unit $1d$ sends the transmission power offset value to the terminal 3 through the hand-over source base station 2.

When the transmission power offset value is received from the hand-over source base station 2, the terminal 3 sends the random access signal to the hand-over destination base station with a transmission power obtained by adding the received transmission offset value to the transmission power of the random access signal.

The terminals control their random access signal transmission power so that the reception unit of the base station receive simultaneously the transmitted random access signals at the same reception level (this control operation will be described later). However, since the transmission power offset calculated by the base station 1 is added to the transmission power of the random access signal sent from the terminal 3 performing the hand-over (random access signal transmitted in a first occasion), the reception level of the signal sent from the terminal 3 at the base station 1 becomes greater than that of the signals sent from the other terminals (terminals sending the random access signal at a second occasion). Therefore, the possibility that the base station 1 receives successfully the random access signal from the terminal 3 performing the hand-over can be improved.

The offset value may also be held to a fixed value. With the fixed offset value, the random access signal sent by the terminal 3 performing the hand-over is likely to be received by the base station with a higher reception power than other random access signals sent by terminals not performing a hand-over. This will improve the possibility of successful reception of the random access signal at the base station, shortening a hand-over process.

In that case, the terminal count acquisition unit (acquisition of the possibility of contention of random access signals) is not provided. The transmission power offset value calculation unit just needs to read the fixed value from a storage unit, in accordance with a hand-over request at the hand-over request reception unit, and give the value to the transmission power offset value transmission unit. The transmission power offset value calculation unit may obtain the fixed value (positive value) if the possibility of contention of random access signals is high (in comparison with a given reference), and may obtain an offset value of zero if the possibility of contention is low (in comparison with the given reference).

When a hand-over request is received, the base station 1 obtains the number of terminals each sending a random access signal (possibility of contention of random access signals) and calculates the transmission power offset value for a random access signal to be sent by the terminal 3 performing a hand-over to the base station 1, in accordance with the obtained number of terminals (degree of possibility of contention). The calculated transmission power offset value is sent through the hand-over source base station 2 to the terminal 3.

Now, the terminal 3 performing the hand-over can send the random access signal to the base station 1 with the transmission power obtained by adding the transmission power offset value. This improves the possibility that the base station 1 can receive successfully the random access signal of the terminal 3 performing the hand-over.

The present embodiment will be described in further detail with reference to the drawings.

Figure 2:
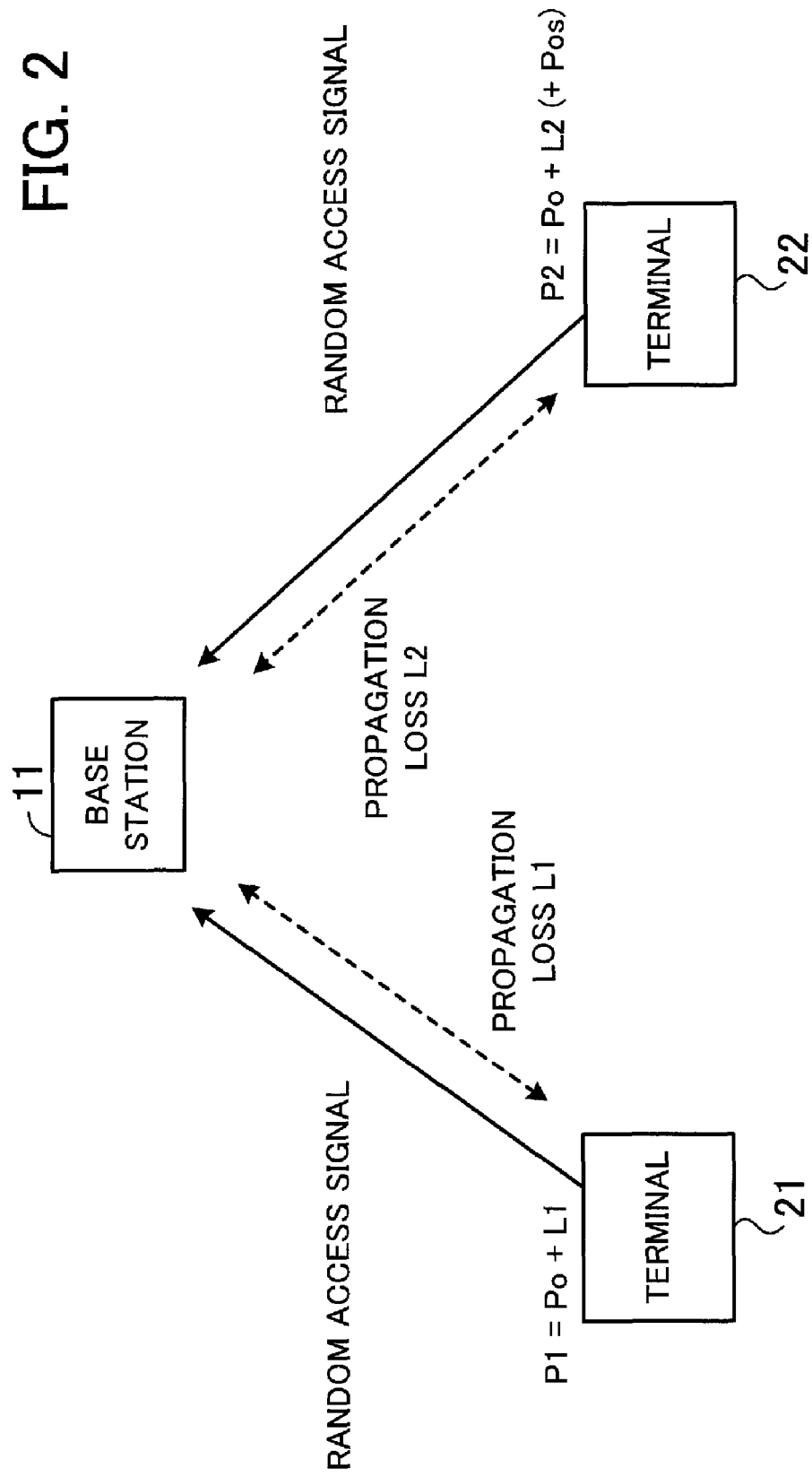
FIG. 2 is a diagram illustrating an example structure of a communication system that includes a base station and terminals.

FIG. 2 is a diagram illustrating an example structure of a communication system that includes a base station and terminals. FIG. 2 presents a base station 11 and terminals 21 and 22, which are mobile telephones, for example.

There are multiple preamble sequences (binary data or non-binary data, for example) for random access signals to be sent by the terminals 21 and 22, and their values are predetermined. The terminals 21 and 22 each select a preamble sequence randomly from the plurality of given preamble sequences and send it to the base station 11. Alternatively, the terminals each use a sequence provided for hand-over use.

The preamble sequence PS can be generated, for example, by a code generating expression, such as Equation (1) given below.

$$PS=f(x,y) \qquad (1)$$

where f is a code generating expression; x determines the length of the preamble sequence; and y selects a preamble sequence.

For example, when 1, 2, . . . , and 64 are assigned to y in Equation (1), 64 different preamble sequences PS1, PS2, . . . , and PS64 are obtained. When n is assigned to y in Equation (1), the preamble sequence PSn having an identical value is always obtained. The terminals 21 and 22 each can select randomly the preamble sequence to be sent, by specifying the value of y randomly. When 139 is assigned to x, a preamble sequence of 139 bits long is obtained. When 839 is assigned, a preamble sequence of 839 bits long is obtained. A longer preamble sequence can be generated by duplicating an original sequence and concatenating the original one and the duplicated one. The length of the preamble sequence depends on the time width of the slot.

Because a plurality of terminals each send a random access signal, the base station 11 receives added preamble sequences. The base station 11 performs correlation processing of each of predetermined preamble sequences and the received preamble sequences and detects a correlation peak value to identify the preamble sequences sent from the plurality of terminals. In the example given above, for example, the base station 11 performs correlation processing of each of the preamble sequences PS1, PS2, . . . , and PS64 and the received preamble sequences and detects a correlation peak value to identify the preamble sequences sent from the plurality of terminals.

The base station 11 reports the identified preamble sequences to the terminals 21 and 22 simultaneously. With this report, the terminals 21 and 22 can find whether the random access signals they sent were or were not received by the base station 11. If a terminal realizes that its preamble transmission failed, it selects again a preamble sequence randomly and resends it to the base station 11. An example of the random access signal will be described next.

Figure 3:
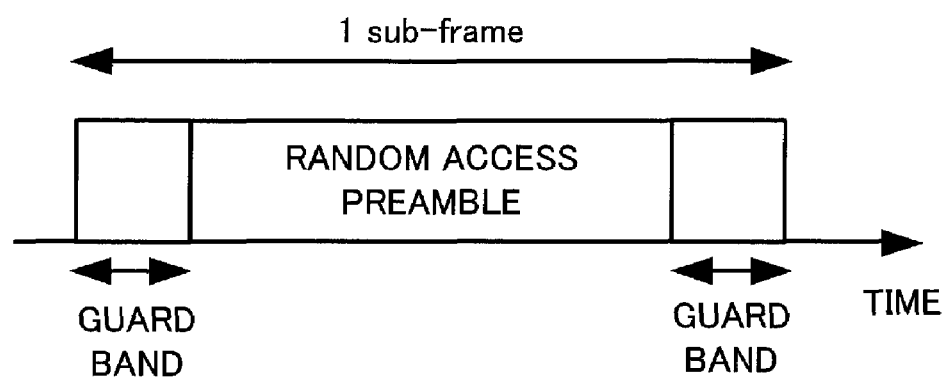
FIG. 3 is a diagram illustrating an example of a random access signal.

FIG. 3 is a diagram illustrating an example of the random access signal. As presented in FIG. 3, the random access signal has a random access preamble and guard bands. The random access preamble stores a preamble sequence. A guard band is provided to avoid interference with the next frame, because the terminals send random access signals asynchronously.

Figure 4:
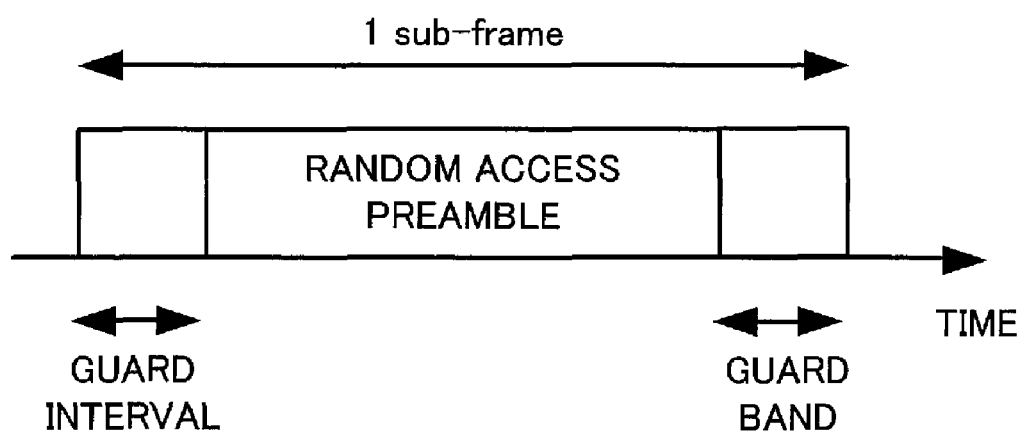
FIG. 4 is a diagram illustrating another example of a random access signal.

FIG. 4 is a diagram illustrating another example of the random access signal. As presented in FIG. 4, the random access signal has a random access preamble, a guard band, and a guard interval. The guard interval is provided to make up for a transmission delay of the random access signal sent from each terminal.

The description of FIG. 2 will continue. The transmission power of the random access signal is determined generally on the basis of propagation loss between each of the terminals 21 and 22 and the base station 11 (open loop control). More specifically, each of the terminals 21 and 22 averages out the pilot signals included in downlink (DL) signals from the base station 11 and calculates the propagation loss from the base station 11 in accordance with the average value. Each of the terminals 21 and 22 adds the calculated propagation loss to the transmission power common to all the terminals to obtain the transmission power of the random access signal.

Let the propagation loss between the base station 11 and the terminal 21 be L1 and the propagation loss between the base station 11 and the terminal 22 be L2. Let the transmission power common to all the terminals be Po. Then, the random access signal transmission power P1 of the terminal 21 is given by the following Equation (2).

$$P1 = Po + L1 \qquad (2)$$

The random access signal transmission power P2 of the terminal 22 is given by the following Equation (3).

$$P2 = Po + L2 \qquad (3)$$

By adding the propagation loss L1 or L2 from the base station 11 to the transmission power Po common to all the terminals, the time-average of random access signal reception power of the base station 11 becomes constant. Therefore, the probabilities of detecting the preamble sequences sent to the base station 11 from the terminals 21 and 22 become equal on average over a certain time period.

For a terminal performing a hand-over, the possibility that the preamble sequence is received successfully by the base station 11 will be improved. Accordingly, the terminal performing the hand-over sends a random access signal with the transmission power obtained by adding the offset value. If the terminal sends a preamble sequence at a first occasion, the transmission power is increased (by adding the offset value), in comparison with that at a second occasion, even in the same radio environment (propagation loss).

Then, even if the preamble sequence of the terminal performing a hand-over collides with the preamble sequence of another terminal, the possibility that the base station 11 identifies the preamble sequence of the terminal performing the hand-over is improved.

Suppose that the terminal 22 in FIG. 2 performs a hand-over from a base station (not illustrated in FIG. 2) to the base station 11. The random access signal transmission power P3 of the terminal 22 is given by the following Equation (4).

$$P3 = Po + L2 + Pos \qquad (4)$$

Equation (4) differs from Equation (3) in that the power offset value Pos is added.

As described above with reference to Equation (3), if the terminal 22 does not perform a hand-over, the random access signal transmission power of the terminal 22 is calculated so that the reception power at the base station 11 becomes the same as that for the other terminal 21.

If the terminal 22 performs a hand-over, the terminal 22 sends a random access signal with transmission power obtained by adding the power offset value to the normal transmission power, as given by Equation (4).

Now, the base station 11 receives the random access signal of the terminal 22 with greater reception power than that of the terminal 21. This makes it easier for the base station 11 to identify the random access signal of the terminal 22 performing the hand-over.

At a hand-over, the hand-over destination base station calculates the power offset value and reports the value to the hand-over source base station. It is preferable that the hand-over source base station report the power offset value to the terminal performing the hand-over.

In the same way as in the above-described example, if the base station 11 is the hand-over destination base station for the terminal 22, the base station 11 calculates the power offset value. The base station 11 reports the calculated power offset value to the hand-over source base station, which is not presented in FIG. 2, for the terminal 22, and the hand-over source base station reports the power offset value to the terminal 22. The terminal 22 sends a random access signal to the hand-over destination base station 11 with a transmission power obtained by adding the power offset value reported from the hand-over source base station.

Figure 5:
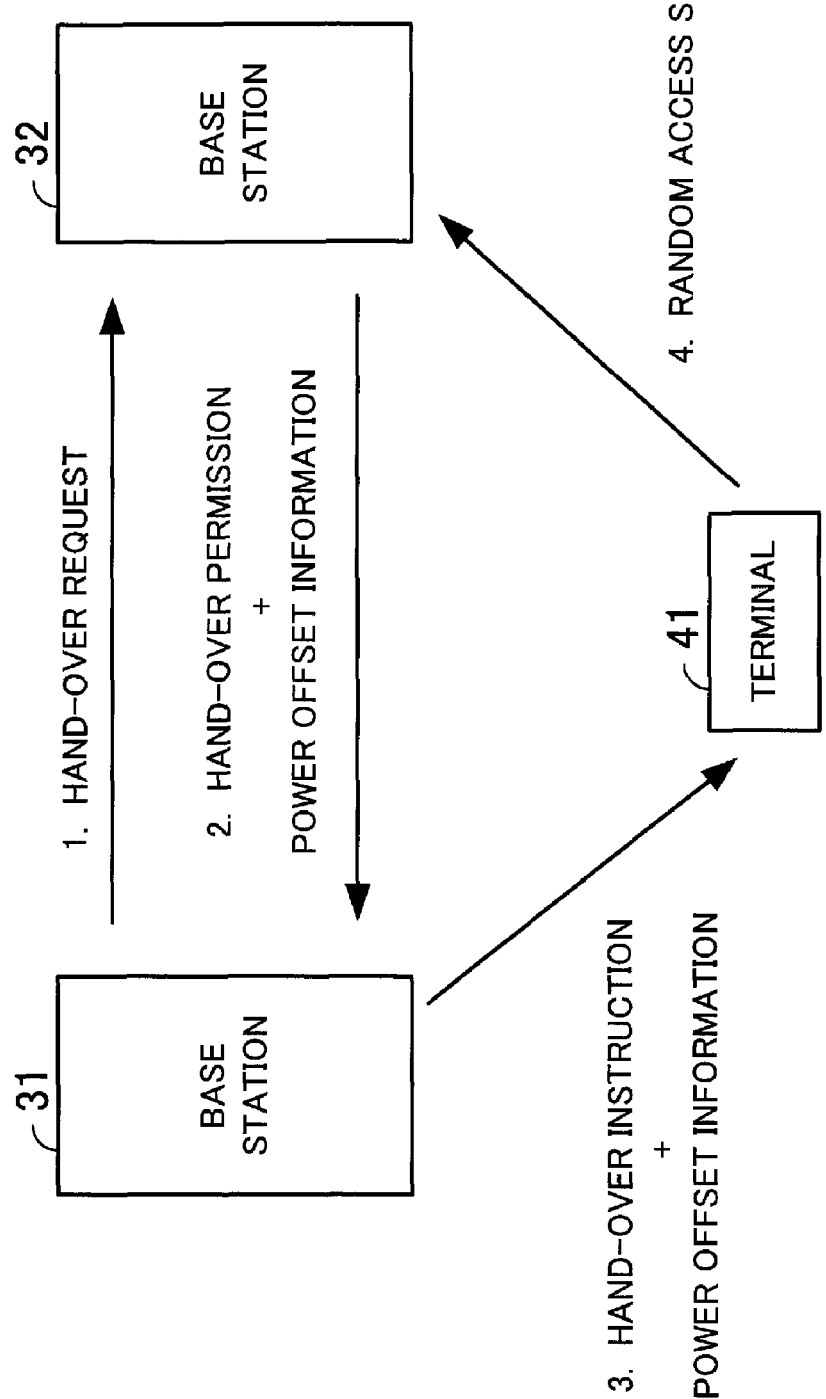
FIG. 5 is a diagram illustrating the operations of a terminal and base stations.

FIG. 5 illustrates the operations of a terminal and base stations. FIG. 5 presents base stations 31 and 32 and a terminal 41. Suppose that the terminal 41 is currently performing wireless communication with the base station 31.

The terminal 41 measures the levels of nearby cells and reports the results to the base station 31. If the terminal 41 comes closer to the base station 32, the level of the cell that includes the base station 32 increases. Then, the base station 31 makes a hand-over request to the base station 32 (indicated in FIG. 5 by 1. Hand-over request).

The base station 32 can recognize the possibility of contention of random access signals, on the basis of the number of terminals sending random access signals to the base station 32, and the like, as described earlier. In accordance with the number of terminals sending the random access signals to the base station 32, the base station 32 determines the power offset of the terminal 41 performing a hand-over.

For example, as the number of terminals from which the random access signals are received in a past occasion of random access signal transmission increases, the base station 32 increases the offset power value of the terminal 41. This is because the correlation peak value of the preamble sequences is buried as the number of terminals sending the random access signals increases. Although a large power offset value can be reported always, appropriate adjustment of the offset value is preferred because the power consumption of the terminal 41 can be reduced. If the random access signal transmission power of the hand-over terminal is offset, the probability of detecting the random access signal sent from the hand-over terminal is improved in the reception unit of the base station, whereas the probability of detecting the random access signal sent from a non-hand-over terminal at the same time is reduced. It is therefore preferable that the offset value be adjusted so as not to be excessively large. Then, even if the base station 32 is serving a plurality of terminals sending random access signals at power-on or the like, it becomes more likely that the base station 32 receives successfully the random access signal of the terminal 41 performing the hand-over.

The base station 32 sends the calculated power offset value and a hand-over permission to the base station 31 (indicated in FIG. 5 by 2. Hand-over permission+power offset information).

When the hand-over permission and the power offset information are received from the base station 32, the base station 31 sends a hand-over instruction and the power offset information to the terminal 41 (indicated in FIG. 5 by 3. Hand-over instruction+power offset information).

The terminal 41 sends a random access signal to the hand-over destination base station 32 (indicated in FIG. 5 by 4. Random access signal). The terminal 41 sends the random access signal with a transmission power obtained by adding the propagation loss between the base station 32 and the terminal 41 and the power offset value reported from the hand-over source base station 31 to the common transmission power.

Figure 6:
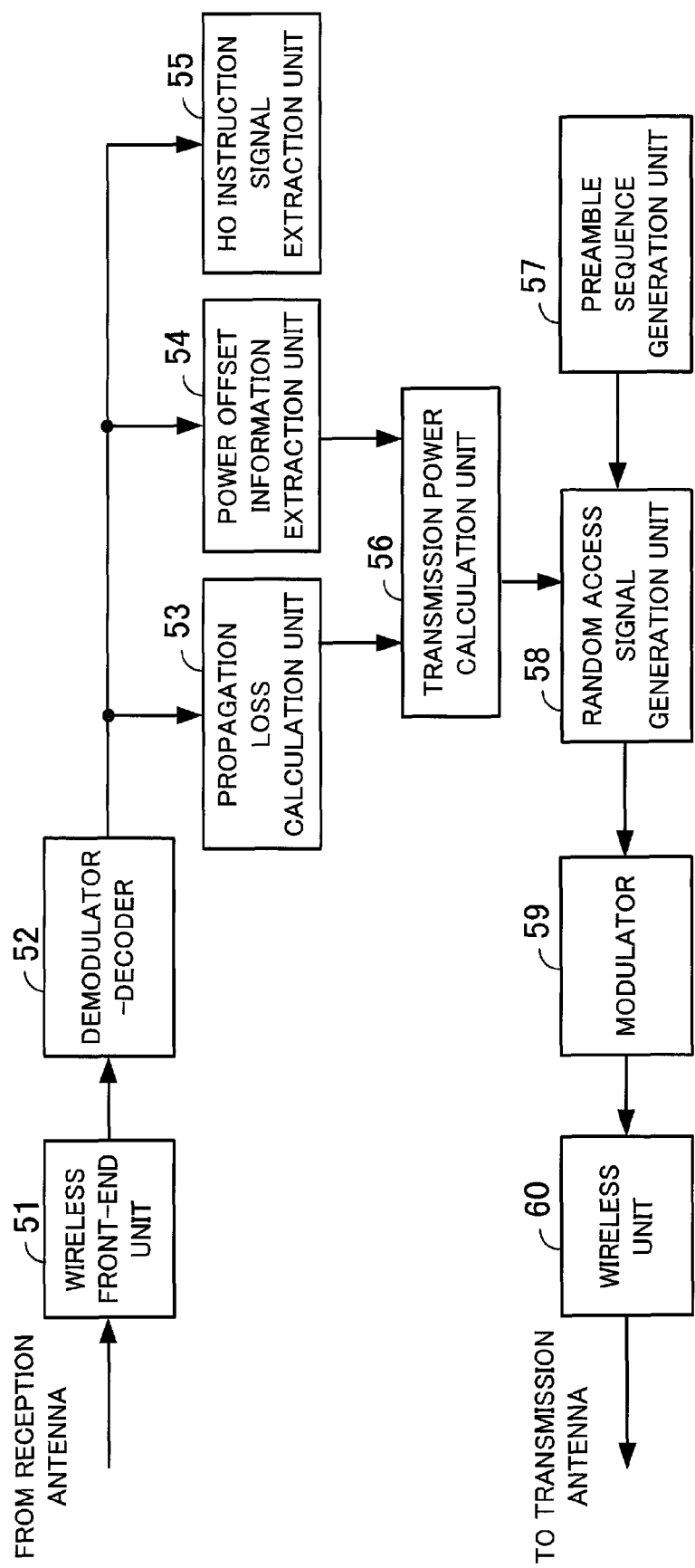
FIG. 6 is a functional block diagram of the terminal.

FIG. 6 is a functional block diagram of the terminal. As presented in FIG. 6, the terminal includes a wireless front-end unit 51, a demodulator-decoder 52, a propagation loss calculation unit 53, a power offset information extraction unit 54, a hand-over (HO) instruction signal extraction unit 55, a transmission power calculation unit 56, a preamble sequence generation unit 57, a random access signal generation unit 58, a modulator 59, and a wireless unit 60.

The wireless front-end unit 51 down-converts the frequency of a DL signal sent from the base station, received by a reception antenna, performs predetermined processing, and outputs the result to the demodulator-decoder 52.

The demodulator-decoder 52 demodulates or decodes the encoded data of the DL signal and outputs the data to the propagation loss calculation unit 53, the power offset information extraction unit 54, and the HO instruction signal extraction unit 55.

The propagation loss calculation unit 53 obtains the average value of pilot signals sent from the base station and calculates the propagation loss from the base station in accordance with the average value.

The power offset information extraction unit 54 extracts power offset information from the data output from the demodulator-decoder 52.

The HO instruction signal extraction unit 55 extracts a hand-over instruction signal from the data output from the demodulator-decoder 52.

The transmission power calculation unit 56 calculates the transmission power of a random access signal sent to the base station at a hand-over (at a first occasion), in accordance with the propagation loss calculated by the propagation loss calculation unit 53 and the power offset information extracted by the power offset information extraction unit 54. More specifically, the propagation loss and the power offset value included in the power offset information are added to the transmission power common to all terminals. At a second occasion, the power offset value is not added to the propagation loss, so that the transmission power at the first occasion differs from that at the second occasion.

The preamble sequence generation unit 57 generates a preamble sequence. For example, the preamble sequence generation unit 57 generates a preamble sequence randomly, as given by Equation (1).

The random access signal generation unit 58 generates a random access signal in accordance with the preamble sequence generated by the preamble sequence generation unit 57. The random access signal generation unit 58 generates the random access signal so that the signal is sent to the base station with the transmission power calculated by the transmission power calculation unit 56.

The transmission power calculation unit and the random access signal generation unit are presented as an example of a control unit.

The modulator 59 modulates the random access signal generated by the random access signal generation unit 58.

The wireless unit 60 up-converts the frequency of the signal output from the modulator 59, amplifies the signal, and outputs it to a transmission antenna. Now, the random access signal is sent to the base station by radio.

Figure 7:
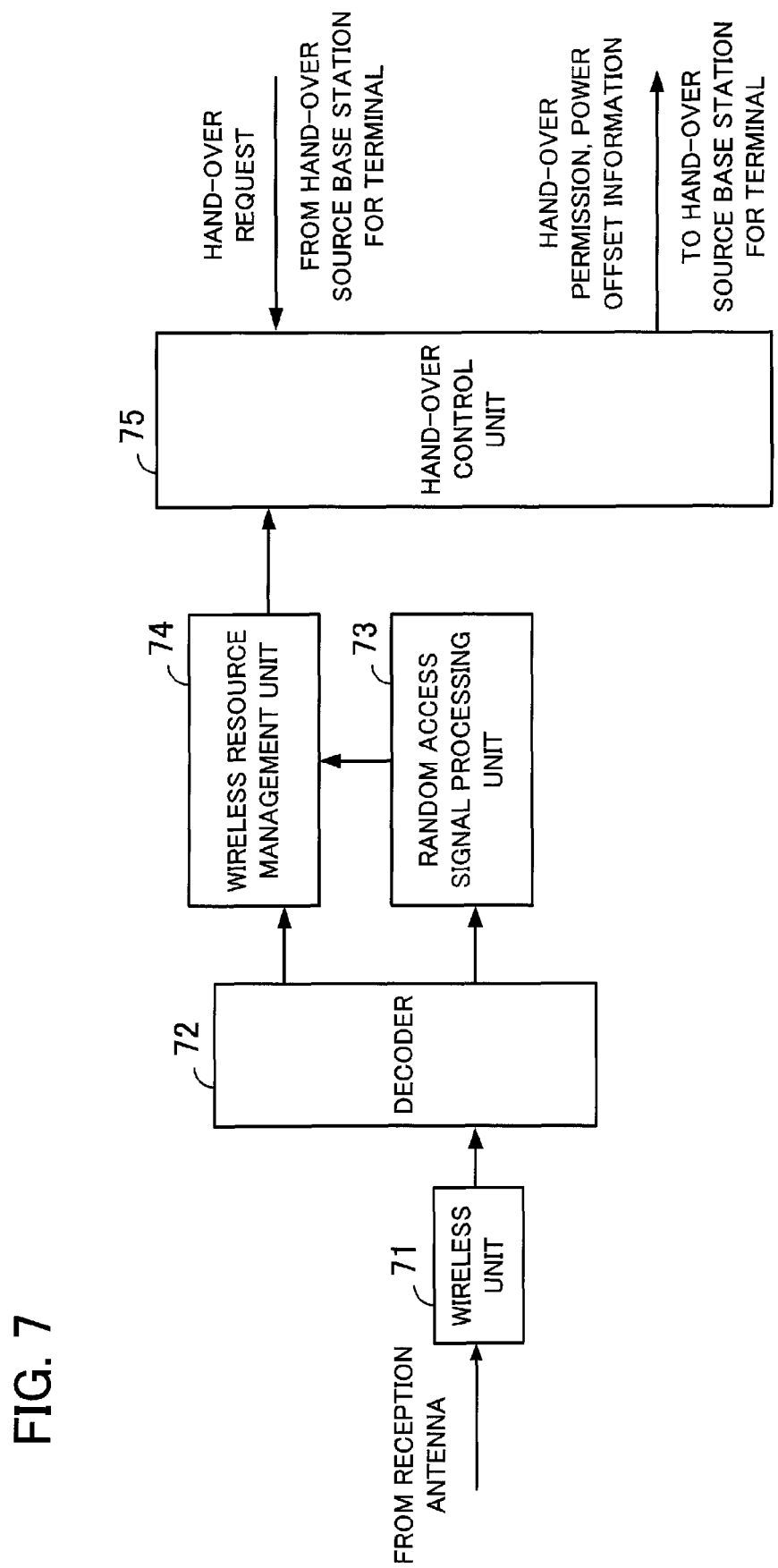
FIG. 7 is a functional block diagram of a hand-over destination base station.

FIG. 7 is a functional block diagram of a hand-over destination base station. As presented in FIG. 7, the hand-over destination base station includes a wireless unit 71, a decoder 72, a random access signal processing unit 73, a wireless resource management unit 74, and a hand-over control unit 75.

The wireless unit 71 down-converts the frequencies of signals sent from terminals, received by a reception antenna, performs predetermined processing, and outputs the results to the decoder 72.

The decoder 72 decodes the encoded data of the signals and outputs the data to the random access signal processing unit 73 if the signals received from the terminals are random access signals. User data, control information, and other data are output to the wireless resource management unit 74.

The random access signal processing unit 73 performs correlation processing of the preamble sequences of the received random access signals and each of a plurality of predetermined preamble sequences and detects a correlation peak value to identify the preamble sequences sent from the plurality of terminals. The identified preamble sequences are reported to the corresponding terminals. With the report, each terminal knows whether the random access signal it sent has been received and recognized by the base station.

The wireless resource management unit 74 performs scheduling of wireless resources of terminals which are under the control of the base station. The wireless resource management unit 74 also performs scheduling of wireless resources of a terminal which has sent a random access signal successfully. The wireless resource management unit 74 can recognize the number of terminals sending random access signals to the base station, in accordance with the number of random access signals handled by the random access signal processing unit 73. The wireless resource management unit 74 outputs the number of terminals sending the random access signals to the hand-over control unit 75.

When a hand-over request is received from the hand-over source base station for a terminal, the hand-over control unit 75 determines whether to permit the hand-over of the terminal. The hand-over control unit 75 also calculates the power offset value from the number of terminals sending the random access signals, reported from the wireless resource management unit 74. For example, as the number of terminals sending the random access signals to the base station increases, the power offset value is increased accordingly. As the number of terminals sending the random access signals to the base station decreases, the power offset value is decreased accordingly. When the terminal is permitted to perform a hand-over, the hand-over control unit 75 sends a hand-over permission and power offset information to the hand-over source base station for the terminal.

Figure 8:
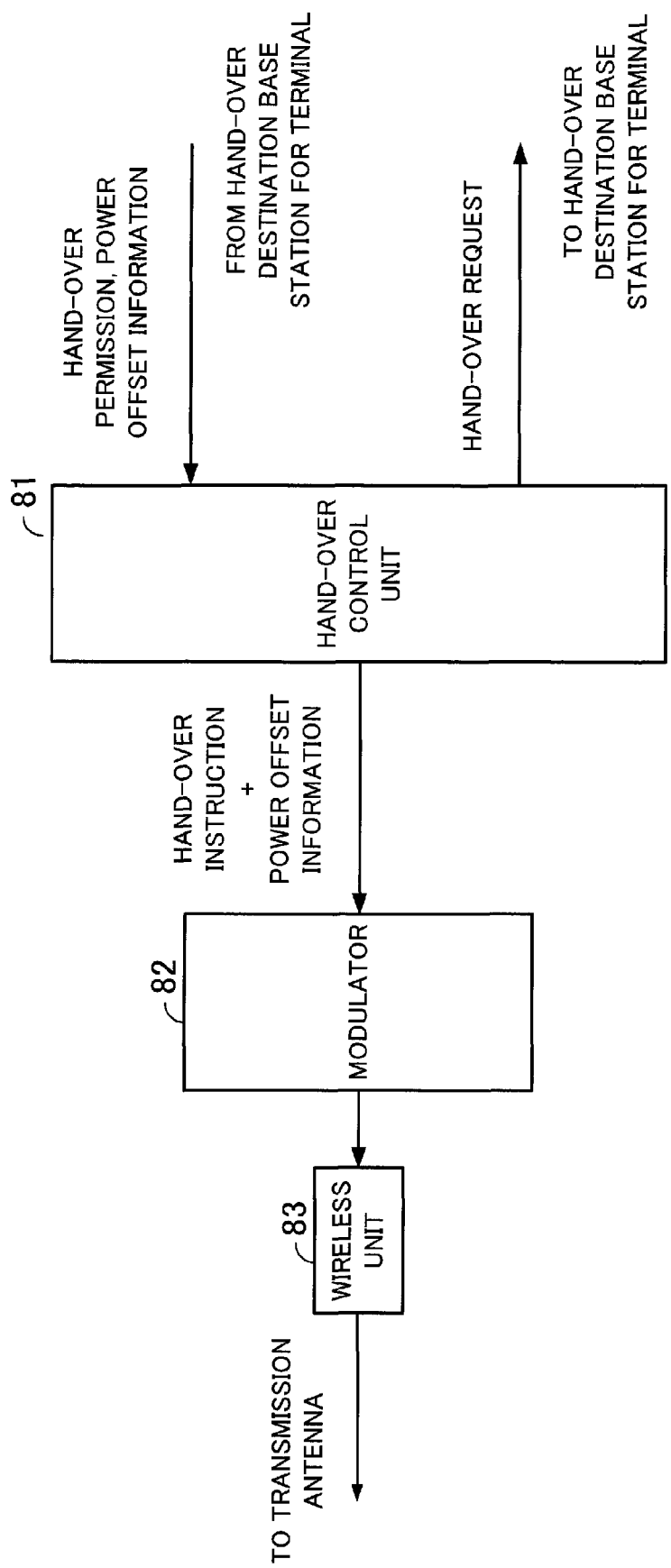
FIG. 8 is a functional block diagram of a hand-over source base station.

FIG. 8 is a functional block diagram of a hand-over source base station. As presented in FIG. 8, the hand-over source base station includes a hand-over control unit 81, a modulator 82, and a wireless unit 83.

If it is determined that a terminal under the control of the base station requires a hand-over, the hand-over control unit 81 makes a hand-over request to the hand-over destination base station. The hand-over control unit 81 also receives a hand-over permission and power offset information sent from the hand-over destination base station. When the hand-over permission and power offset information are received from the hand-over destination base station, the hand-over control unit 81 outputs a hand-over instruction, which instructs the terminal to perform a hand-over, and the power offset information to the modulator 82.

The modulator 82 modulates the hand-over instruction and the power offset information.

The wireless unit 83 up-converts the frequency of the signal output from the modulator 82, amplifies the signal, and outputs it to a transmission antenna. Now, the hand-over instruction and the power offset information are sent to the terminal by radio.

The terminal is brought to send a random access signal to the hand-over destination base station with transmission power obtained by adding the propagation loss from the hand-over destination base station and the power offset value to the transmission power common to all the terminals, as described with reference to FIG. 6. In a hand-over, the propagation loss from the hand-over destination base station can be calculated from a common pilot signal sent in the downlink from the hand-over destination base station, because the terminal is included also in the cell of the hand-over destination base station.

Figure 9:
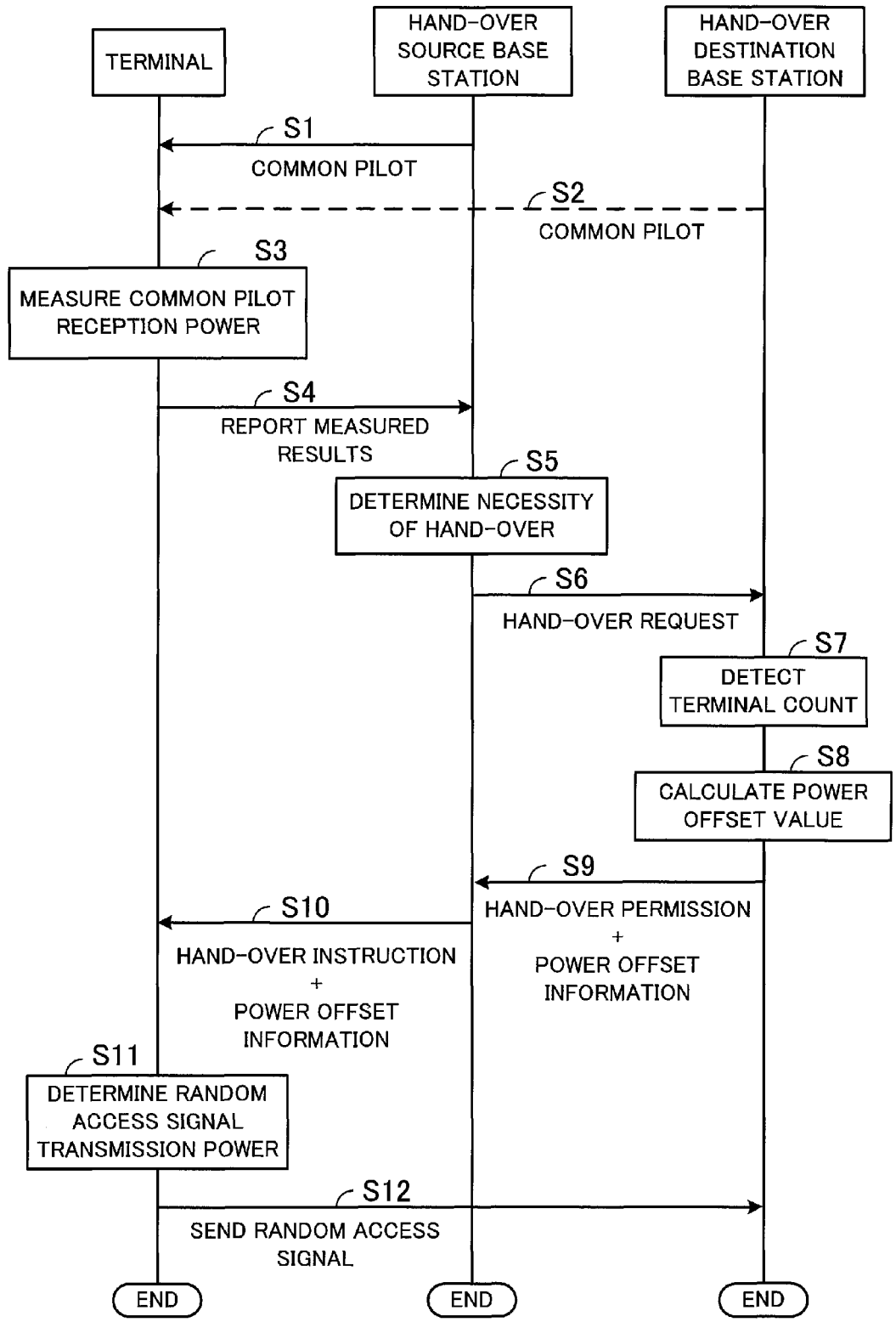
FIG. 9 is a sequence diagram illustrating the operations of the terminal, the hand-over source base station, and the hand-over destination base station.

FIG. 9 is a sequence diagram illustrating operations of the terminal, the hand-over source base station, and the hand-over destination base station.

In steps S1 and S2, the hand-over source base station and the hand-over destination base station each send a common pilot signal in the down-link.

In step S3, the terminal measures reception power with the common pilot signals from the hand-over source base station and the hand-over destination base station.

In step S4, the terminal sends the results of reception power measurement to the hand-over source base station.

In step S5, the hand-over source base station judges the necessity of hand-over from the results of reception power measurement received from the terminal.

In step S6, the hand-over source base station makes a hand-over request to the hand-over destination base station, in accordance with the judgment made in step S5.

In step S7, the hand-over destination base station detects the number of terminals each sending a random access signal to the base station.

In step S8, the hand-over destination base station calculates a power offset value in accordance with the number of terminals detected in step S7.

In step S9, the hand-over destination base station sends a hand-over permission and power offset information to the hand-over source base station which has made the hand-over request.

In step S10, the hand-over source base station sends a hand-over instruction and the power offset information to the terminal.

In step S11, the terminal receives the hand-over instruction from the hand-over source base station and performs hand-over processing. The terminal determines the transmission power of a random access signal to be sent to the hand-over destination base station, in accordance with the power offset information sent from the hand-over source base station.

In step S12, the terminal sends the random access signal to the hand-over destination base station.

As described above, the hand-over destination base station obtains the number of terminals each sending the random access signal (the possibility of contention of random access signals) when the hand-over request is received, and calculates the power offset value of the random access signal of the hand-over terminal, in accordance with the obtained number of terminals. The calculated power offset value is sent through the hand-over source base station to the terminal. The hand-over source base station sends the power offset value calculated by the hand-over destination base station to the terminal. The terminal sends the random access signal to the hand-over destination base station with transmission power obtained by adding the transmission power offset value received from the hand-over source base station to the transmission power of the random access signal.

This increases the possibility that the hand-over destination base station can receive successfully the random access signal from the terminal performing a hand-over.

The hand-over destination base station may obtain a preamble sequence not used by the terminals sending random access signals. The obtained preamble sequence may be sent through the hand-over source base station to the terminal performing a hand-over. The terminal sends a random access signal by using the preamble sequence sent from the hand-over destination base station. Through this operation, the collision of random access signals in the hand-over destination base station can be prevented.

For example, the random access signal processing unit 73 in FIG. 7 can recognize the preamble sequences of received random access signals. Therefore, the hand-over control unit 75 can obtain a preamble sequence that is not used by the terminals and can send it together with the power offset information to the hand-over source base station. (Alternatively, each base station may have some preamble sequences exclusively used for hand-over terminals. And the hand-over destination base station allocates one of the sequences to the hand-over terminal and sends it to the hand-over source base station.) The random access signal generation unit 58 in FIG. 6 generates a random access signal by using the preamble sequence sent from the hand-over destination base station.

The hand-over destination base station may obtain the preamble sequences used by the terminals sending random access signals. The obtained preamble sequences may be sent through the hand-over source base station to the terminal performing a hand-over. The terminal selects a preamble sequence other than the preamble sequences sent from the hand-over destination base station and sends a random access signal. Then, the collision of random access signals in the hand-over destination base station can be prevented.

For example, the random access signal processing unit 73 in FIG. 7 can recognize the preamble sequences of received random access signals. Therefore, the hand-over control unit 75 can obtain the preamble sequences used by the terminals and can send them together with the power offset information to the hand-over source base station. The preamble sequence generation unit 57 in FIG. 6 generates a preamble sequence other than the preamble sequences sent from the hand-over destination base station and outputs it to the random access signal generation unit 58.

According to the present invention, a terminal, a random access signal transmission method, and a base station that improve the possibility that a random access signal sent from the terminal performing a hand-over can be received successfully by the base station can be provided.

The random access signal sent from the terminal performing the hand-over is given preference over the random access signals sent from terminals irrelevant to the hand-over in terms of power, and the possibility of failure of successful reception of the random access signal sent from the terminal performing the hand-over at the base station because of collision can be reduced.

The purposes, features, and advantages of the present invention, including the ones described above, will be clarified through the subsequent description related to the attached drawings illustrating preferred embodiments of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions and alterations could be made hereto without departing from the spirit and scope of the invention.

What is claimed is:

1. A terminal which sends a random access signal to a base station, the terminal comprising:
 a control unit which controls a random access signal to be transmitted from the terminal, according to information provided from a hand-over destination base station which specifies, in response to a hand-over instruction from a hand-over source base station, a preamble sequence not used by other terminals currently sending random access signals to the hand-over destination base station, as well as a first transmission power level for the random access signal which is higher than a second transmission power level used in other occasions; and
 a transmission unit which sends the random access signal to the hand-over destination base station with the preamble sequence and first transmission power level as controlled by the control unit.

2. The terminal according to claim 1, wherein:
 the information provided from the hand-over destination base station specifies an offset value for the random access signal, and
 the control unit calculates the first transmission power level by adding the offset value to the second transmission power level.

3. The terminal according to claim 2, wherein the control unit receives the information from the hand-over destination base station via the hand-over source base station.

4. The terminal according to claim 2, wherein the given offset value is calculated by the hand-over destination base station.

5. The terminal according to claim 2, wherein the given offset value is adjusted to increase as the possibility of contention of random access signals received by the hand-over destination base station increases.

6. The terminal according to claim 2, wherein the given offset value depends on the degree of possibility of contention of random access signals received by the hand-over destination base station.

7. A random access signal transmission method by which a terminal sends a random access signal to a base station, the random access signal transmission method comprising:
 selecting, by a hand-over destination base station in response to a hand-over instruction regarding the terminal from a hand-over source base station, a first transmission power level for a random access signal to be transmitted by the terminal, the first transmission power level being higher than a second transmission power level used in other occasions;
 selecting, by the hand-over destination base station, a preamble sequence not used by other terminals currently sending random access signals to the hand-over destination base station;
 sending information on the selected preamble sequence and an offset value for the selected first transmission power level from the hand-over destination base station to the terminal through the hand-over source base station; and
 sending the random access signal by the terminal to the hand-over destination base station with the preamble sequence and first transmission power level sent from the hand-over destination base station.

8. A base station which can perform wireless communication with a terminal, the base station comprising:
 a selection unit which selects, in response to a hand-over instruction regarding the terminal from a hand-over source base station, a preamble sequence not used by other terminals currently sending random access signals to the hand-over destination base station, as well as a first transmission power level for a random access signal to be transmitted by the terminal, the first transmission power level being higher than a second transmission power level used in other occasions; and
 a transmission unit which sends to the terminal a signal specifying the selected preamble sequence and an offset value for the selected first transmission power level, such that the terminal transmits a random access signal to the hand-over destination base station by using the preamble sequence and first transmission power level sent from the hand-over destination base station.

* * * * *